Patented June 7, 1932

1,861,458

UNITED STATES PATENT OFFICE

HARRY SOBOTKA, OF NEW YORK, N. Y.

DEXTRO-5-PHENYL-5'-ETHYL HYDANTOIN

No Drawing.     Application filed September 8, 1930. Serial No. 480,617.

My invention relates to an improvement in hypnotics of the hydantoin group, consisting in an increase of their beneficial, soporiferous, sedative, hypnotic and narcotic action with simultaneous elimination of their injurious toxic properties.

Doubly substituted hydantoins of the Formula I are known for their sedative, hypnotic and narcotic effects.

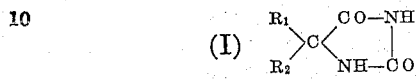

Emil Fischer and Mehring observed the hypnotic action of diethyl hydantoin ($R_1=R_2=CH_3.CH_2-$) in 1902. Phenyl-ethylhydantoin is used as a sedative in epileptics and chorea minor. Phenyl-propyl and phenyl-isobutyl-hydantoins are said to show similar effects. However, all these substances show ill after-effects besides their pharmacological purpose. They are known to have caused severe kidney damage, and other toxic reactions in several cases, and they cause drug eruption accompanied by high temperatures in the majority of the patients, especially in children.

I found that these hydantoins when substituted with two groups different from each other, e. g. two of the following, methyl, ethyl, propyl and other aliphatic groups, aromatic groups as phenyl, hydroaromatic groups as cyclohexyl, and substituted derivatives of the aforementioned groups viz. bromo-allyl, may be separated by certain procedures into two optically active forms, rotating the plane of polarized light to the same degree to the right and to the left side respectively, and that these optical antipodes may also be obtained separately by similar chemical procedures. As hydantoins react as acids, they can be resolved into their optically active moieties through salt formation with optically active bases, particularly alkaloids. The optically active substances thus obtained not only differ from the optically inactive hydantoin by their optical activity, but also by a completely new set of properties, viz. by their melting points, solubility in various solvents etc. Below are given examples to illustrate various methods employing the resolution of optically active compounds and yielding satisfactory amounts of optically active doubly substituted hydantoins in a theoretical yield, in some instances.

*Example I.*—20.2 grams optically inactive phenyl-ethyl-hydantoin were dissolved in 200 cc. absolute alcohol, and a filtered solution of 46.6 grams brucin alkaloid in 200 cc. absolute alcohol was added. About 32 grams of crystals consisting of the brucin salt of dextro-phenyl-ethyl-hydantoin, appeared on standing in the ice-box.

These crystals were redissolved in absolute alcohol and 100 cc. N/1 sulfuric acid was added. The solution was diluted with water to a final alcohol content of about 10 percent. The precipitate of crystalline dextro-phenyl-ethyl-hydantoin was filtered, dried and purified by several crystallizations from dilute ethyl-alcohol until the reaction for the alkaloid became negative. The pure substance has a melting point of 235° (uncorrected) while the racemic phenyl-ethyl-hydantoin melts at 199°. Its optical activity is $$(\alpha)_D = +118° \text{ to } +123°$$

depending on nature of the solvent concentration and temperature.

The mother liquor of the brucin-dextro-phenyl-ethyl-hydantoin salt was acidified and diluted with water to 10 percent alcohol content. The free levo-phenyl-ethyl-hydantoin was obtained as a white crystalline precipitate; upon recrystallization it has a melting point of 235° and an optical rotation of $$(\alpha)_D = -120°.$$

The brucin was recovered from both halves in satisfactory quantity.

Both forms may also be obtained separately by applying the syntheses for disubstituted hydantoins to optically active amino acids or related derivatives.

*Example II.*—5 grams optically active phenyl-ethyl-amino-acetic acid (II)

(II) 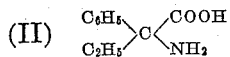

plus the double amount of urea is dissolved in 25 cc. of water and heated for 10 hours with reflux. The excess urea is removed by fractional crystallization from water and dilute alcohol. Both the dextra- and levo-rotatory forms of phenyl-ethyl-hydantoic acid (III)

(III) 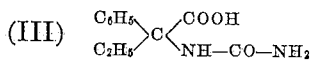

may be obtained from the respective phenyl-ethyl-glycine (=phenyl-ethyl-amino-acetic acid). Instead of urea alkali cyanate may be employed. A concentrated solution of either dextro- or levo-phenyl-ethyl-hydantoic acid upon heating with dilute acid, e. g. sulfuric acid, is converted into the corresponding optically active phenyl-ethyl-hydantoin. A satisfactory yield of either substance was obtained showing melting point, optical rotation and biological properties identical with the substances obtained according to Example I.

*Example III.*—Optically active disubstituted amino-acetic acid may be readily converted into its amide (IV)

(IV) 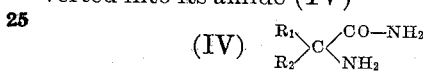

which upon treatment with chemically active substances containing a —CO— group as phosgene, chloro-carbonic ester, diphenyl-carbonate will form a hydantoin-ring retaining the optically active configuration on the doubly substituted carbon atom.

*Example IV.*—Optically active disubstituted amino-aceto-nitril (V)

(V) 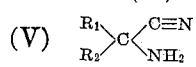

or an ester of disubstituted amino-acetic acid as its ethyl ester (VI)

(VI) 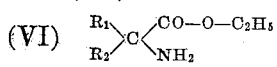

when treated with alkali cyanate or urea will yield the nitril or ester of the disubstituted optically active hydantoic acid respectively, which in turn, may be converted by saponification with acid, e. g. sulfuric acid, into the corresponding disubstituted optically active hydantoin.

*Example V.*—The action of alkali hypohalite upon optically active disubstituted cyanoacetamides (VII)

(VII) 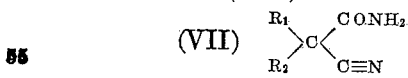

results in the formation of the corresponding optically active hydantoin through an oxidative rearrangement of the CN group.

It is remarkable that these syntheses can be applied without appreciable concomitant racemization; this stability is due to the absence of a hydrogen atom on the optically active carbon atom.

Besides the separation of the dextro- and levo-form of these disubstituted hydantoins and their parent substances by purely chemical procedures, biological means for their resolution are furnished by microorganisms and enzymes, I found it possible to grow certain moulds like aspergillus on an aqueous solution of pure optically inactive phenyl-ethyl-hydantoin-sodium. Since the mould in this instance preferred the levo-form as a nutrient, the solution after 2 days was dextrorotatory and dextro-phenyl-ethyl-hydantoin could be isolated from it in crystalline form.

Biological properties of optical antipodes of disubstituted hydantoins.

Patients given the levorotatory substance, in several instances developed a drug eruption with the same features as those observed upon administration of the optically inactive drug. The rash appears during the second week after the first dose starting from the extremities, measle-like in appearance and accompanied by raised body temperature.

The other form, in the case of phenyl-ethyl-hydantoin, the dextro-rotatory form, is as strong a hypnotic and sedative as the optically inactive drug, both on humans and on animals, independent of the route of administration. In rare cases has this pharmacologically effective substance produced a drug eruption or concomitant untoward reactions. These injurious reactions as observed with the racemic mixture are mainly due to the pharmacologically ineffective antipode. In mixtures containing unequal amounts of the dextro- and levo-form the pharmacological effect was found proportional to the share of the dextro-form present, the undesirable effects depending on the amount of the levo-antipode present.

I claim,

A dextro-rotatory substance of the formula

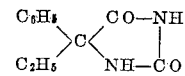

called dextro-5-phenyl-5′-ethyl-hydantoin, having soporiferous, sedative, hypnotic and narcotic properties and essentially free from its optical antipode.

In testimony whereof I affix my signature.

HARRY SOBOTKA.